United States Patent [19]
Belokin et al.

[11] Patent Number: 5,381,990
[45] Date of Patent: Jan. 17, 1995

[54] RELEASABLE SUCTION CUP ASSEMBLY

[76] Inventors: Paul Belokin; Martin P. Belokin, both of P.O. Box 1907, Denton, Tex. 76202; Norman P. Belokin, 3341 Evers Pkwy., Denton, Tex. 76207

[21] Appl. No.: 148,905

[22] Filed: Nov. 5, 1993

[51] Int. Cl.⁶ .............................. F16B 47/00
[52] U.S. Cl. .................. 248/205.9; 248/362
[58] Field of Search ......... 248/205.8, 205.9, 205.5, 248/205.6, 205.7, 206.1, 206.2, 206.3, 206.4, 362, 363, 683, 309.3

[56] References Cited
U.S. PATENT DOCUMENTS

| | | | |
|---|---|---|---|
| 2,055,397 | 9/1936 | Zaiger | 248/206.1 |
| 2,876,980 | 3/1959 | Salter | 248/206.3 |
| 2,936,139 | 5/1960 | Lindstrom | 248/362 X |
| 3,310,267 | 3/1967 | Koehler | 248/205.8 X |
| 4,133,575 | 1/1979 | Mader | 248/205.8 X |
| 4,421,288 | 12/1983 | Blaszkowski | 248/363 X |
| 4,607,875 | 8/1986 | McGirr | 248/205.9 X |

FOREIGN PATENT DOCUMENTS

| | | | |
|---|---|---|---|
| 0415335 | 6/1925 | Germany | 248/206.1 |
| 0149955 | 12/1931 | Sweden | 248/206.4 |

*Primary Examiner*—Ramon O. Ramirez
*Attorney, Agent, or Firm*—Jack A. Kanz

[57] ABSTRACT

Releasable suction cup assemblies for use in supporting an object on a smooth surface are formed by a cup body which has a duct passing therethrough and a valve element for selectively opening the duct whereby the vacuum of the suction cup can be released for repositioning the suction cup. The valve extends through the duct and is threaded on one end to receive a threaded fastener which is used to move the valve element into a sealing position and to secure the suction cup to an object. The stem portion of the suction cup may have an annular slot therein and an expanded lip which is deformed outwardly by inserting a plug in the slot.

16 Claims, 4 Drawing Sheets

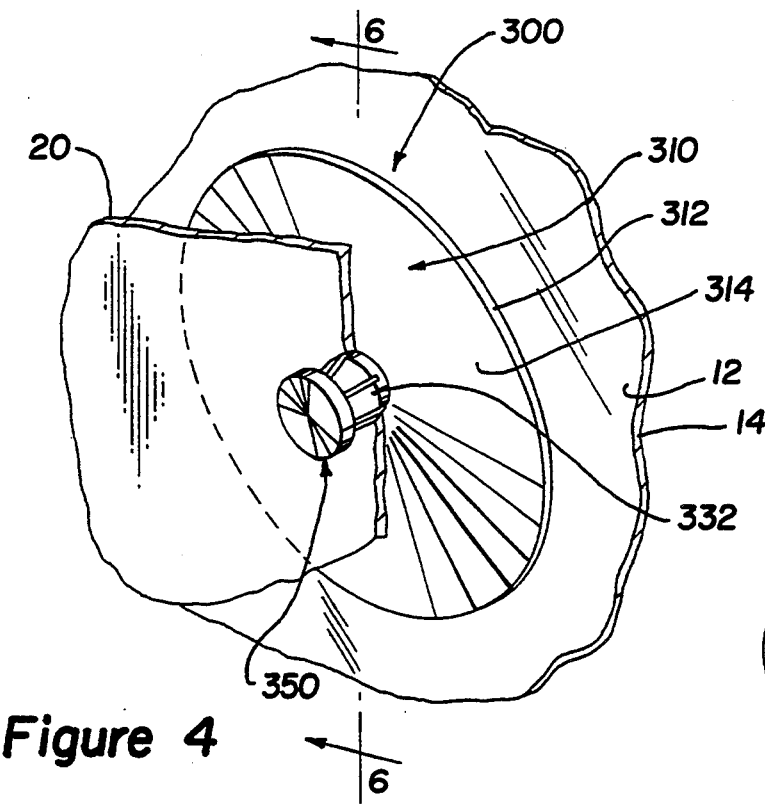
Figure 4
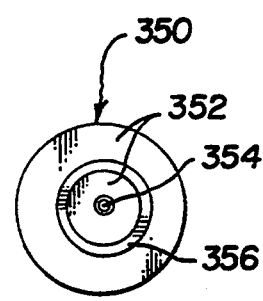
Figure 7
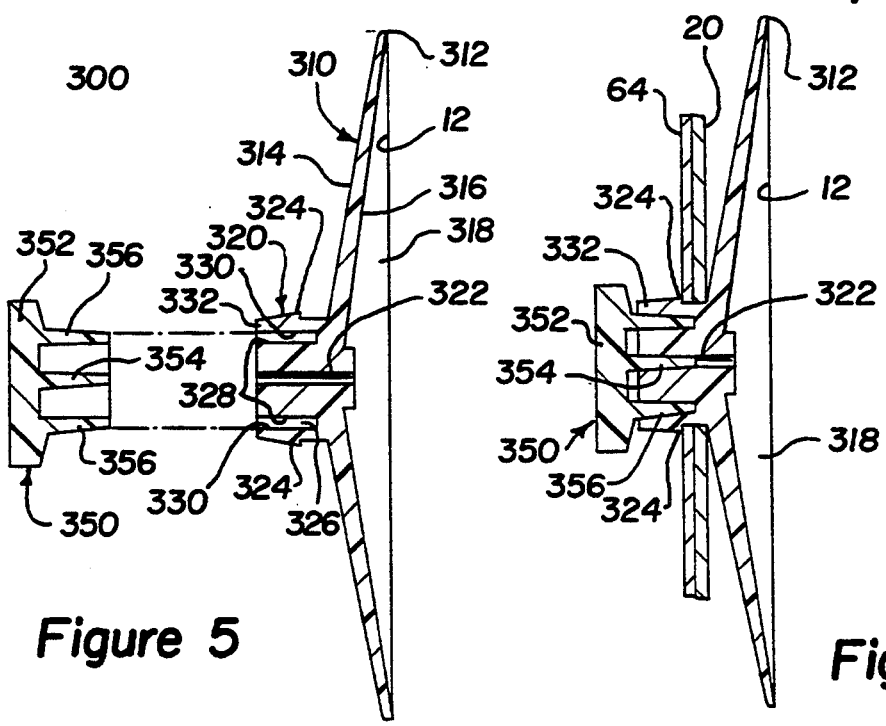
Figure 5
Figure 6

RELEASABLE SUCTION CUP ASSEMBLY

This invention relates to releasable suction cup assemblies and to methods of mounting objects to surfaces using such assemblies. More particularly, it relates to suction cup assemblies using a valve to control cup sealing to a flat surface so that the suction cups can be positioned, relocated and removed with ease.

BACKGROUND OF THE INVENTION

Suction cups are commonly used to mount and secure objects to smooth surfaces such as the surfaces of glass, plastic, formica, glazed tile, metal, etc. The typical suction cup includes a cup body and a stem. The cup body is generally arcuate or circular and defines a concavity. Typically the stem is integrally formed on the body and used as the place of attachment for the object to be supported by the suction cup. At least the body of the suction cup is made of rubber, plastic or other material having sufficiently resilient properties such that when the body is pressed against a smooth surface the volume of concavity is reduced, forcing air to be expelled so that the body forms an air-tight seal against the smooth surface. Atmospheric pressure outside the body retains the suction cup body against the surface. When the air-tight seal is broken, air rushes into the concavity, releasing the suction attachment to the surface and the resilient material of the suction cup body returns to its relaxed condition. The resilient suction cup can be repeatedly reused.

Problems often arise in use of suction cups in that they are difficult to properly position. Once a suction cup is attached to a surface, the suction forces (atmospheric and friction) resist repositioning of the cup. Attachment of the suction cup to an object can also be a problem. Preferably, the attachment should be releasable.

U.S. Pat. No. 2,221,238 to S. L. Johnson discloses a suction cup having normally closed slits in the stem communicating with the concavity of the suction cup body and a C-shaped clamp for connecting an object to the stem. The suction cup is particularly adapted for mounting a vibrating object such as a typewriter to a horizontal surface. The slits operate similarly to a one-way valve. When the suction cup is pressed against a surface (during installation or downward vibration of the object) air pressure developed in the compressed concavity of the suction cup is expelled through the slits, resulting in creation of a vacuum within the cup body. Outside atmospheric pressure acting on the stem tends to keep the slits closed, thus preventing the entrance of air into the cup. When the body is forcefully lifted vertically away from the surface, the C-shaped clamp presses upwardly against the stem, which stretches the walls of the stem, thereby opening the vent slits and permitting air to enter into the cup to relieve the vacuum and release the cup from the supporting surface.

U.S. Pat. No. 2,319,727 to J.E. Duggan discloses a vented suction cup having a valve in the suction cup body. When it is desired to remove the cup structure from the mounting surface, the valve is pulled sufficiently to distort the rubber and open an air passage. Thus, air from the atmosphere may enter the body of the suction cup to destroy the vacuum and release the cup from the mounting surface.

U.S. Pat. No. 4,196,882 to Rognon discloses a double suction cup holder in which two oppositely oriented suction cups are connected by a shared stem. The double suction cup holder can be used to secure objects such as memo pads to a flat surface. A longitudinal air passageway through the stem connects the concavities of the two cups. An opening traverses the passageway and has a valve member rotatably positioned therein. The valve member has inter-communicating longitudinal and diametrical bores. When the valve is turned so that its diametrical bore communicates with the air passageway in the stem, the vacuum in the cups is spoiled, thereby releasing the cups from the two surfaces.

SUMMARY OF THE INVENTION

In accordance with the present invention, releasable suction cup assemblies are used for supporting an object (such as a display shelving unit or like) adjacent a surface such as a wall, pane of glass, etc. The suction cup body is generally cup-shaped having an inner surface which defines a concavity. When the suction cup body is positioned adjacent a smooth surface for mounting an object, the inner surface of the suction cup and the smooth surface define a closed chamber. The suction cup includes a duct, passageway or bore communicating between the concavity and the outside atmosphere. A valve element is provided for selectively opening or closing the duct, passageway or bore so that the suction cup can be easily released from the smooth surface for repositioning the suction cup against a surface. The suction cup assembly may include a removable stem (for connecting the suction cup body to an object to be mounted adjacent a surface) including a valve element for selectively opening or closing the duct or bore. In one embodiment of the invention, the stem extends through a bore of the suction cup and is threaded on one end to receive a threaded fastener which is used to move the valve element on the stem into a sealing position when the fastener is used to secure the suction cup to an object to be supported. In an alternative arrangement, the stem portion of the suction cup body has an annular slot defined by a concentric inner cylindrical wall and outer cylindrical wall. The outer cylindrical wall is formed of a plurality of wall segments and portions of a peripheral expanded lip are formed on the upper ends of the wall segments forming the outer cylindrical wall. The stem portion is formed of resilient material so that the outer wall segments can be deformed into the annular slot to reduce the effective diameter of the expanded lip. Thereby, the stem can be inserted through an aperture in a wall or object to be mounted to a smooth surface. Once through the aperture, the outer wall segments return to the relaxed condition and the expanded lip thereon retains the suction cup assembly on the object at the aperture. The suction cup assembly may also include a removable retainer having an annular plug for filling the annular slot, thereby providing rigidity to the outer wall segments and preventing the expanded lip from deforming into the annular slot. Preferably, the removable retainer also has a central plug which performs as a valve element for selectively opening or closing the duct or bore so that the suction cup can be easily released from the smooth surface for repositioning.

In another alternative arrangement, a vented stem portion on the suction cup body has a generally cylindrical shape with threads formed on the outside thereof.

An aperture in a wall of the object to be supported is provided having corresponding threads formed on the interior thereof. To mount the object adjacent a smooth surface with this suction cup assembly, the threaded stem portion of the suction cup is threaded into the corresponding threads of the aperture in the object, thereby connecting the suction cup to the object. A removable retainer with a plug portion is adapted to plug the vented duct of the stem portion. The plug also assists in maintaining the rigidity of the stem portion, thereby assisting in maintaining the threads in proper engagement with the correspondingly threaded aperture so that the object is securely connected to the suction cup assembly.

BRIEF DESCRIPTION OF THE DRAWING

The accompanying drawing is incorporated into and forms a part of the specification to illustrate several examples of the present invention. The drawing is only illustrative of preferred and alternative examples of the invention and is not to be construed as limiting the invention in any way. Various advantages and features of the invention will become apparent from the following detailed description taken in connection with the attached drawing in which:

FIG. 4 is a perspective view of an alternative configuration of a suction cup assembly according to the present invention;

FIG. 5 is an exploded sectional view of the suction cup assembly shown in FIG. 4;

FIG. 6 is a sectional view of the suction cup assembly of FIG. 4 taken along line 6—6;

FIG. 7 is a bottom plan view of the cap configuration of the suction cup assembly shown in FIGS. 4–6;

DESCRIPTION OF PREFERRED EMBODIMENTS

Figure 1:
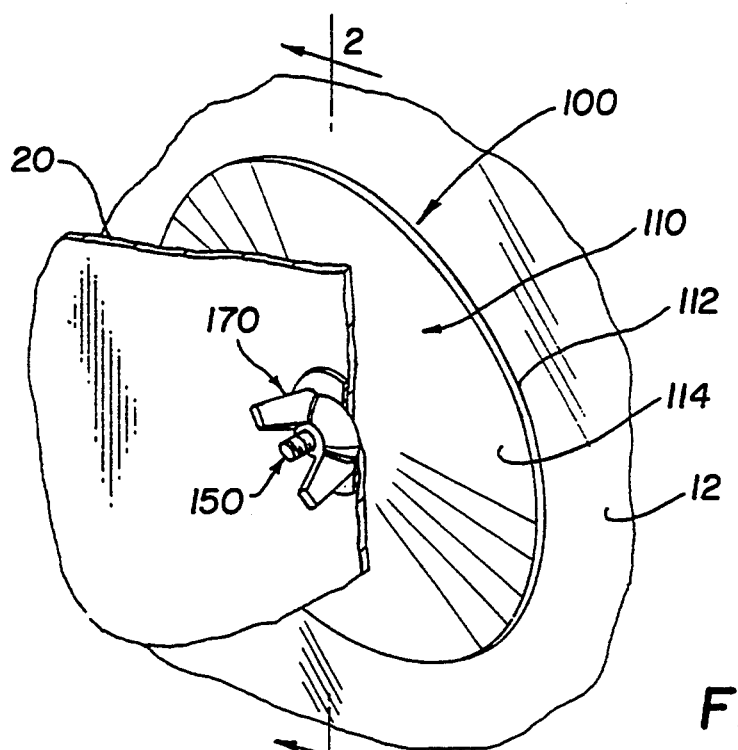
FIG. 1 is a perspective view of one embodiment of the suction cup assembly of the invention.

Presently preferred embodiments of the invention are described herein by referring to apparatus and methods showing various examples of how the invention can be made and used. Like reference numerals are used throughout the description and the several views of the drawing to indicate like or corresponding parts.

Figure 2B:
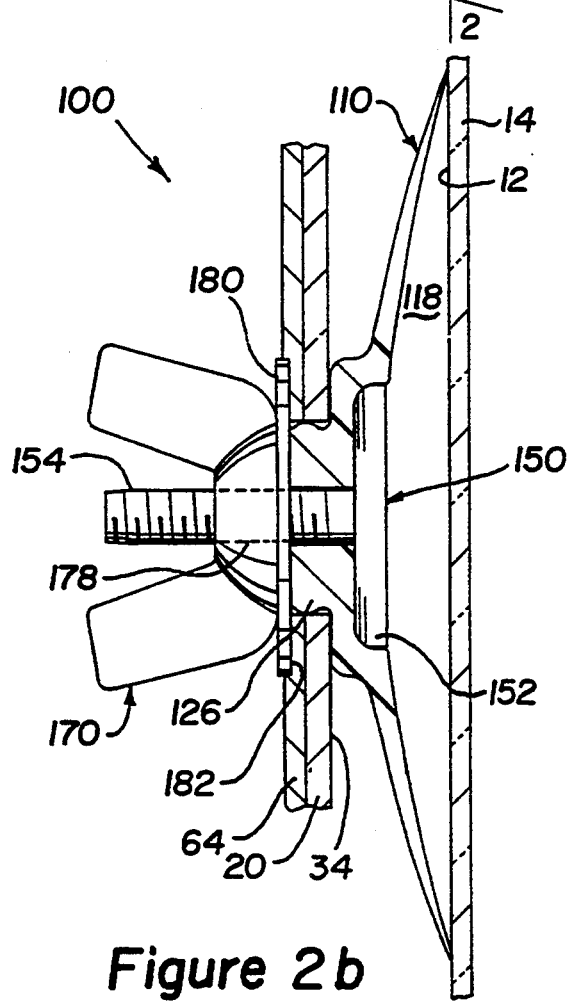
FIGS. 2a and 2b are sectional views taken along line 2—2 of FIG. 1 showing the suction cup in attached and released conditions.
Figure 2A:
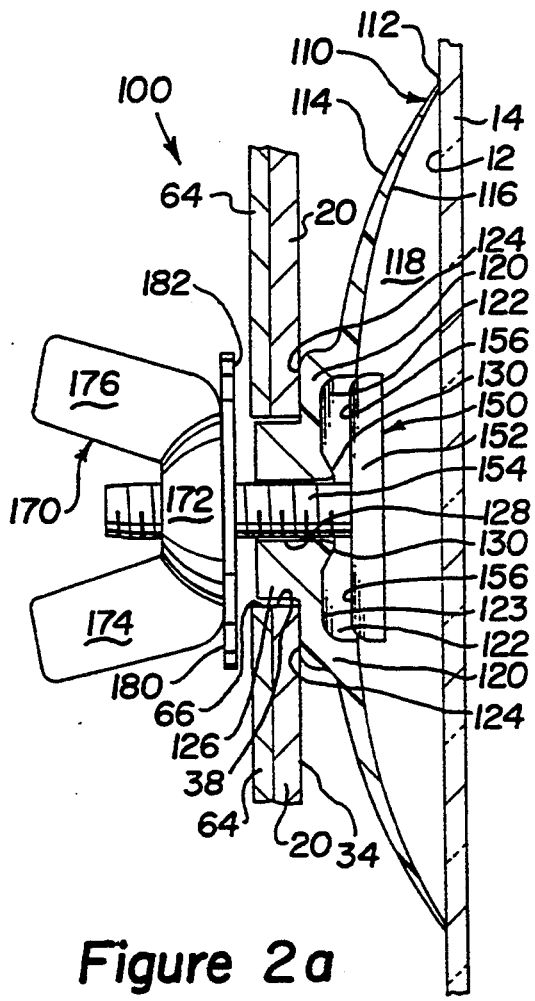
Figure 3:
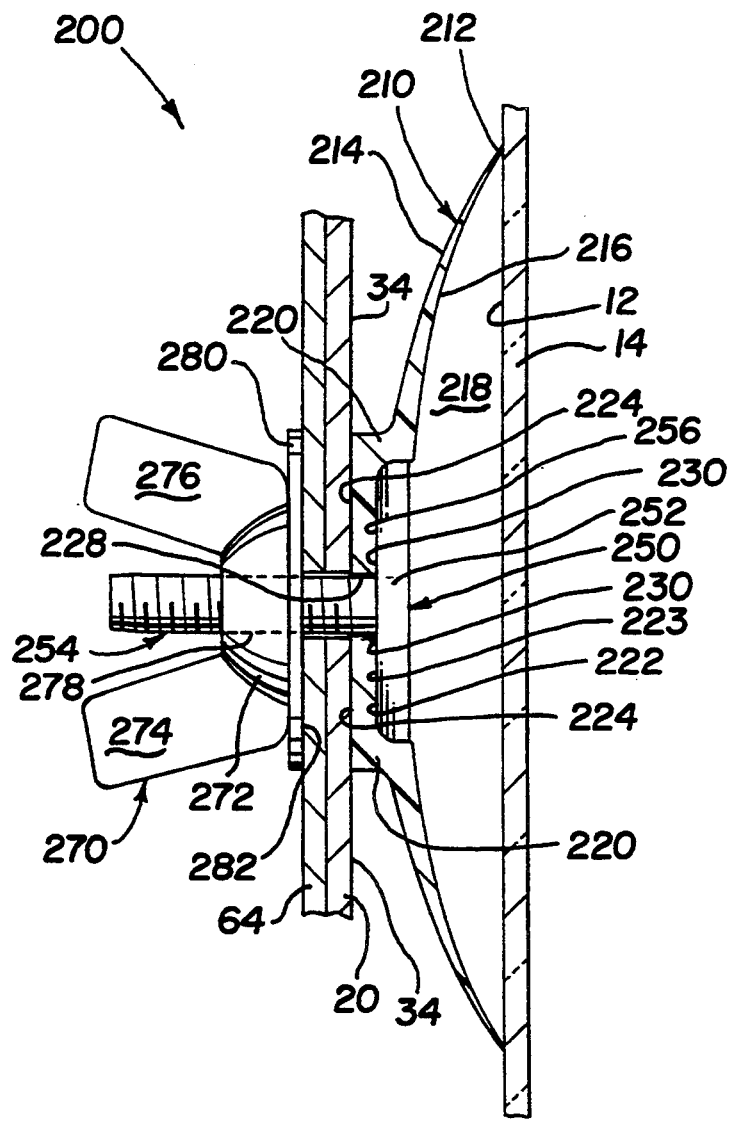
FIG. 3 is a sectional view of an alternative configuration of a suction cup assembly of FIG. 1.

FIGS. 1–3 illustrate one embodiment of the invention wherein a suction cup assembly 100 of FIG. 1 is shown connected at an aperture in an object 20 to be supported which may be the back wall of display apparatus or the like. The suction cup assembly 100 generally comprises a suction cup body 110, a stem 150 and a removable retainer 170.

The structure and operation of the suction cup assembly 100 is illustrated in FIGS. 2a and 2b. The cup body, referred to by the reference numeral 110, is generally cup-shaped and has a peripheral edge 112, an outer surface 114, and an inner surface 116 which defines a concavity. The peripheral edge 112 is preferably circular as shown in FIG. 1. However, it is to be understood that the cup 110 could have other generally cup-like shapes.

When the cup body 110 is positioned adjacent a smooth surface, such as smooth surface 12 of a glass pane 14, the inner surface 116 and surface 12 substantially close the concavity to form a chamber 118. The cup body 110 is preferably made of a resilient material such as rubber or plastic and has sufficiently resilient properties such that when it is pressed against a smooth surface, the cup body is deformed and flattened onto the surface 12 and the volume of chamber 118 is greatly reduced. As the volume of the chamber 118 is reduced, air is expelled. The deformable body 110 of the suction cup conforms to the smooth surface 12 and forms and air-tight seal against the smooth surface. Atmospheric pressure acting on the outer surface 112 of the cup body retains the suction cup against the smooth surface 12.

The cup body 110 preferably has a flange portion 120 located at its center which defines a recess 122. Recess 122 can be generally circular, square, hexagonal or any other desired shape to accommodate the shape of the stem 150. Recess 122 has a lower, generally annularly-shaped surface 123 formed thereon. Flange portion 120 is preferably generally circular in shape and has a diameter larger than the diameter or largest dimension of an aperture in the object to be mounted thereon. Flange portion 120 also has an upper annular surface 124 for contacting the outer surface of the object to be mounted thereon. It is to be understood, of course, that flange portion 120 can have other shapes, such as square or hexagonal, for example.

A neck 126 formed on the flange portion 120 extends above the flange portion 120. The height of the neck 126 is about the same as the depth of the aperture in the object to be mounted. If the material of the neck 126 is resilient, the height can be correspondingly greater than the depth of the aperture. If the material is not resilient and the wall of the object to be mounted is somewhat compressible (such as corrugated material or the like) the height of the neck 126 can be less than the depth of the aperture.

The neck 126 preferably conforms to the shape of the aperture. For example, if the aperture is circular, the neck 126 is preferably cylindrical to conform thereto and the circumference of the neck 126 is slightly smaller than the inner diameter of the aperture. The circumference of the neck 126 is less than the circumference of the flange portion 120 so that the upper surface 124 remains exposed for contacting the outer surface of the object to be mounted around the aperture.

The flange portion 120 and neck 126 of suction cup 110 have a bore 128 therethrough which communicates between the chamber 118 and the outside of the suction cup 110. In the preferred embodiment of the invention, the bore 128 is cylindrical in shape and coaxial with the circular body of the cup 110. The flange portion 120 preferably includes a circumferential curved lobe 130 at the end of the bore 128 which opens into the chamber 118.

The stem 150 has a head 152 and a shaft 154. The stem 150 is preferably removeable and formed of substantially non-resilient plastic material. The head 152 is configured to be of a size and shape to fit within recess 122 defined by flange portion 120 of the cup body 110.

The head 152 has an upper annular surface 156 for engaging the recess 122 and acts as a valve for closing the end of bore 128. The shaft 154 of the stem 150 is preferably threaded and adapted to fit within the bore 128 in the flange portion 120 and neck 126.

If the recess 122 is circular and the head 152 is also circular, the stem 150 is free to rotate within the recess 122. However, in an alternative embodiment of the invention (not shown) the recess 122 in the suction cup 110 and the head 152 of the stem 150 have non-circular configurations, such as square or hexagonal. Thus, non-circular configurations of the recess 122 and head 152 prevent the stem 150 from rotating as the shaft is threaded with the removable retainer 170.

Removable retainer 170 preferably has a central portion 172 and two wings 174 and 176 extending diametrically from the central portion 172. Central portion 172 has a threaded bore 178 (best illustrated in FIG. 2b) adapted for threading onto the threaded shaft 152 of stem 150. Central portion 172 of retainer 170 also has a flange 180 formed thereon. Flange 180 has a diameter at least as large as neck 126 on the body of suction cup 110. More preferably, flange 180 has a diameter at least as large as the flange 120 and has a lower annular surface 182 thereon.

As illustrated in FIGS. 2a and 2b, the threaded portion 154 of stem 150 is positioned through the bore 128 in the suction cup body 110 such that the head 152 of the stem 150 is positioned in the recess 122 defined by the flange portion 120. The neck 126 is then positioned to extend through an aperture in the object 20 to be attached so that the concavity of suction cup 110 faces the supporting surface 12. Retainer 170 is screwed on to the threaded shaft 154 of the stem 150 on the opposite side of the object 20. A plurality of suction cup assemblies 100 can be positioned on an appropriately shaped object 20 in a similar manner. The retainers 170 are not tightened so as to continue to permit air to communicate through the bore 128.

To secure the object 20 to smooth surface 12 of glass 14, the object 20 is positioned adjacent the surface 12 as desired. Until the retainer 170 is tightened, the chamber 118 defined by the inner surface 116 of the suction cup 110 and the surface 12 does not form a vacuum seal. Accordingly, the cup body 110 can be moved along surface 12 and repositioned as desired.

When the object 20 is positioned substantially as desired, a retainer 170 on one of the suction cup assemblies 100 is tightened. As the retainer 170 is tightened on the threaded shaft 154 of the stem 150, the head 152 of the stem 150 and the flange 180 of the retainer 170 are drawn toward each other. The annular area surrounding the aperture 38 in object 20 and tab or spacer 64 is compressed between the lower annular surface 182 of the flange 180 of the retainer 170 and the upper annular surface 124 of the flange portion 120 of the suction cup, thereby firmly connecting the object 20 to the suction cup assembly 100. If the neck 126 is formed of resilient material, it too can be compressed.

The upper surface 156 on the head 152 of the stem 150 compresses the circumferential curved lobe 130 to seal the bore 128, thereby preventing air from communicating between the chamber 118 and the outer atmosphere. When suction cup assembly is pressed against the surface 12 of the glass pane, it expels air from the chamber 118 and forms an air-tight seal against the smooth surface 12 of the glass pane 14. Atmospheric pressure outside the body 110 retains the suction cup against the surface.

If object 20 is not mounted in the desired position (or it becomes desirable to change its position), the removable retainers 170 of the suction cup assemblies 100 can be successively loosened to decompress the circumferential lobe 130 surrounding the opening of the bore 128 and break the vacuum seal of the suction cup 110. The object 20 can then be easily repositioned as desired.

An alternative embodiment of the suction cup assembly of FIG. 1 is illustrated in FIG. 3. The suction cup assembly 200 of FIG. 3 includes a suction cup body 210, a removable stem 250 and a removable retainer 270. The cup body 210 is generally cup-shaped and has a peripheral edge 212, an outer surface 214 and an inner surface 216 which defines a concavity. The peripheral edge 212 of suction cup 210 preferably is circular. However, the cup body 210 could be of other generally cup-like shapes.

When the cup body 210 is positioned adjacent a smooth surface (such as surface 12 of glass pane 14) the inner surface 216 and surface 12 substantially close the concavity to form a chamber 218. The cup body 210 is made of a resilient material such as rubber or plastic and has sufficiently resilient properties such that when it is pressed against a smooth surface, the cup body is deformed and flattened on the surface 12 and the volume of chamber 218 is greatly reduced. As the volume of the chamber 218 is reduced, air is expelled from the chamber and the deformable body of the suction cup 210 conforms to the smooth surface 12 to form an air-tight seal against the smooth surface. Atmospheric pressure acting on the outer surface 214 of the suction cup body retains the suction cup against the smooth surface 12.

The suction cup 210 has a flange portion 220 located at the center of the cup body which defines a recess 222. Recess 222 can be generally circular, square, hexagonal or any other desired shape to accommodate the shape of the removable stem 250. Recess 222 has a lower, generally annular-shaped surface 223 formed thereon. Flange portion 220 is preferably generally circular in shape and has a diameter larger than the diameter or largest dimension of an aperture in an object 20 to be supported thereon. Flange portion 220 has an upper annular surface 224 for contacting the outer surface of the object 20. It is to be understood, of course, that flange portion 220 can have other shapes, such as square or hexagonal, for example.

The flange portion 220 of suction cup 210 has a bore 228 therethrough which communicates between the chamber 218 and the outside of the suction cup 210. In the preferred embodiment of the invention, the bore 228 is cylindrical in shape and coaxial with the circular body of suction cup 210. The flange portion 220 preferably includes a circumferential curved lobe 230 surrounding the end of the bore 228 which opens to the chamber 218.

The removable stem 250 has a head 252 and a shaft 254 and is preferably formed of substantially non-resilient plastic material. The head 252 is configured to be of a size and shape to fit within recess 222 defined by flange portion 220. The head 252 has an upper annular surface 256 for engaging the recess 222 and acts as a valve for closing the end of bore 228. The shaft 254 of the stem 250 is preferably threaded and adapted to fit within the bore 228 in the flange portion 220.

If the recess 222 is circular and the head 252 is also circular, the stem 250 is free to rotate within the recess.

However, in an alternative embodiment of the invention (not shown), the recess 222 and the head 252 of the stem 250 have non-circular configurations, such as square or hexagonal. Thus, non-circular configurations of the recess 222 and head 152 prevent the stem 250 from rotating as the shaft is threaded with the removable retainer 270.

Removable retainer 270 preferably has a central portion 272 and wings 274 and 276 extending diametrically from the central portion 272. Central portion 272 has a threaded bore 278 adapted for threading onto the threaded shaft 252 of stem 250. Central portion 272 of retainer 270 also has a flange 280 formed thereon which has a diameter at least as large as flange portion 220 on the body of suction cup 210 and a lower annular surface 282.

To use a suction cup assembly 200 of FIG. 3, the threaded portion 254 of stem 250 is positioned through the bore 228 in the suction cup 210 such that the head 252 of the stem 250 is positioned in the recess 222 defined by the flange portion 220. The threaded shaft 254 of the stem 250 is then positioned to extend through an aperture in the object 20. Retainer 270 is positioned on the threaded shaft 254 of the stem 250 on the opposite side of object 20. The retainer 270, however, is not tightened so as to continue to permit air to communicate through the bore 228.

To mount the object 20 to smooth surface 12 of glass 14, the inner surface 216 of cup body 210 is placed against surface 12 to position object 20 in the desired position. Until the retainer 270 is tightened, the chamber 218 defined by the inner surface 216 of the suction cup 210 and the surface 12 does not form a vacuum seal.

When the object 20 is positioned substantially as desired, retainer 270 is tightened. As the retainer 270 advances onto the threaded shaft 254 of the stem 250, the head 252 of the stem 250 and the flange 280 of the retainer 270 are drawn toward each other. The annular area surrounding the aperture 38 is compressed between the lower annular surface 282 of the flange 280 of the retainer 270 and the upper annular surface 224 of the flange portion 220 of the suction cup, thereby firmly connecting the object 20 to the suction cup assembly 200.

The upper surface 256 on the head 252 of the stem 250 compresses the circumferential curved lobe 230 to seal the bore 228, thereby preventing air from communicating between the chamber 218 and the outer atmosphere. The suction cup assembly can be pressed against the surface 12 of the glass pane to expel air from the chamber 218. The deformable suction cup 210 forms an air-tight seal against the smooth surface 12 of the glass pane 14. Atmospheric pressure outside the body 210 retains the suction cup against the surface. Where multiple assemblies 200 are used, the retainers 270 of each assembly 200 are successively tightened in a similar manner, and each suction cup assembly is pressed against the surface 12 until the object 20 is firmly mounted to the surface.

If the object is not mounted in the desired position (or if it becomes is desireable to change its position), the removable retainers 270 can be successively loosened to decompress the circumferential lobe 230 surrounding the opening of the bore 228 and break the vacuum seal of the suction cup 210. The object 20 can then be easily repositioned as desired.

Another embodiment of the invention is illustrated in FIGS. 4–8 wherein the suction cup assembly 300 generally comprises a suction cup body 310 and a retainer 350. The suction cup body 310 is generally cup-shaped and has a peripheral edge 312, an outer surface 314 and an inner surface 316 which defines a concavity. The peripheral edge 312 of suction cup 310 is preferably circular. However, it could be of other generally cup-like shapes.

When the suction cup 310 is positioned adjacent a smooth surface such as surface 12 of glass pane 14, the inner surface 316 and surface 12 substantially close the concavity to form a chamber 318. The body of cup body 310 is primarily made of a resilient material such as rubber or plastic and has sufficiently resilient properties such that when pressed against a smooth surface, the suction cup is deformed and flattened on the surface 12 and the volume of chamber 318 is greatly reduced. As the volume of the chamber 318 is reduced, air is expelled from the chamber. The deformable body of the suction cup 310 conforms to the smooth surface 12 and forms an air-tight seal against the smooth surface. Atmospheric pressure acting on the outer surface 314 of the suction cup retains the suction cup against the smooth surface 12.

A stem portion 320 is formed on the body of suction cup 310. The stem portion is generally cylindrical in shape and preferably formed on the body of suction cup 310 of the same resilient material. The stem portion 320 has a duct 322 therethrough which communicates between the chamber 318 and the outer atmosphere. Preferably, the duct 322 is generally cylindrical in shape and coaxial with circular cup body 310.

As illustrated in FIGS. 4–8, the stem portion 320 has an expanded lip 324 which is used to maintain an object 20 having an aperture in a wall thereof on the suction cup assembly 310.

Figure 8:
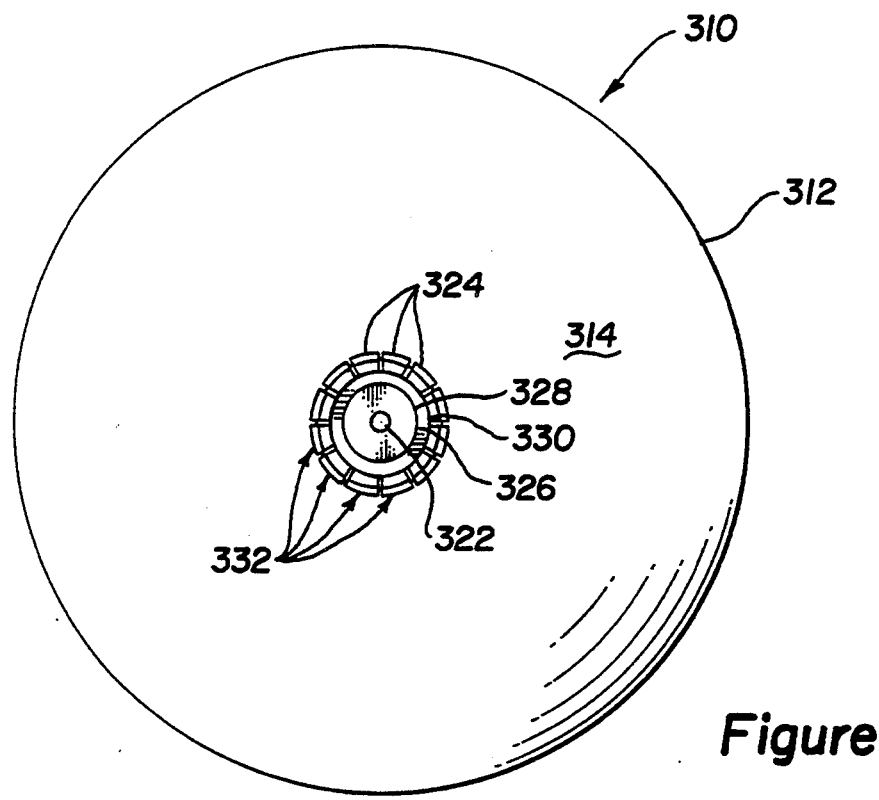
FIG. 8 is top plan view of the suction cup shown in FIGS. 4–6.

The stem portion 320 has an annular slot 326 defined by inner circular wall 328 and outer circular wall 330 which are concentric with the axis of stem portion 320. As best shown in FIGS. 4 and 8, the stem portion 320 has outer wall segments 332 which define the outer wall 330 of annular slot 326 and an expanded lip 324. The outer wall segments resemble the petals of a flower and are formed of the same resilient material as the rest of the suction cup 310. The wall segments 332 can be resiliently pushed together toward the central axis of the stem portion 320 so that the largest diameter of the expanded lip 324 on the wall segments 332 is reduced and the expanded lip can fit through an aperture of similar diameter.

As shown in FIG. 6, the wall segments 332 can be pushed through the aperture in object 20 to connect object 20 to the suction cup assembly 300. Once the expanded lip 324 has been compressed and forced through the aperture, the wall segments 332 return to their relaxed condition and the expanded lip 324 engages the surface of tab 64 to connect the suction cup 310 to the object 20. The suction cup 310 can be removed from the aperture by the reverse process, that is, by compressing the wall segments 332 so that the expanded lip 324 is reduced in diameter and the stem portion 320 can be withdrawn through the aperture.

As best shown in FIGS. 5 and 7, the retainer 350 is preferably integrally formed of substantially non-resilient plastic material and has a top portion 352, a central plug 354 and an annular plug 356. Preferably, the central plug 352 and the annular plug 356 are coaxial. The central plug 354 is slightly tapered from the top portion 352 and adapted to act as a valve which plugs the duct 322. The annular plug 356 is slightly tapered from the top portion and adapted to plug the annular slot 326 formed in the stem portion 320. The annular plug 356 prevents the wall segments 332 of the stem portion 320 from being compressed together, thereby ensuring that the stem is retained in the aperture.

To mount object 20 to surface 12, the stem is compressed and passed through the aperture in object 20. Until the retainer 350 is positioned within the stem portion 320 as shown in FIG. 6, the chamber 318 defined by the inner surface 316 of the suction cup 310 and the surface 12 does not form a vacuum seal. However, once pressed into position as shown in FIG. 6, the central plug 354 of the retainer 350 prevents air from communicating between the chamber 318 and the outer atmosphere. The suction cup assembly 300 can be pressed against the surface 12 to expel air from the chamber 318 and the deformable suction cup 310 forms an air-tight seal against the smooth surface 12. Atmospheric pressure outside the body 310 retains the suction cup against the surface.

If object 20 is not mounted in the desired position (or if it becomes desirable to change its position), the removable retainer 350 can be loosened. This unplugs the duct 322 and breaks the vacuum seal of the suction cup 310. The object 20 can then be easily repositioned as desired.

Figure 9:
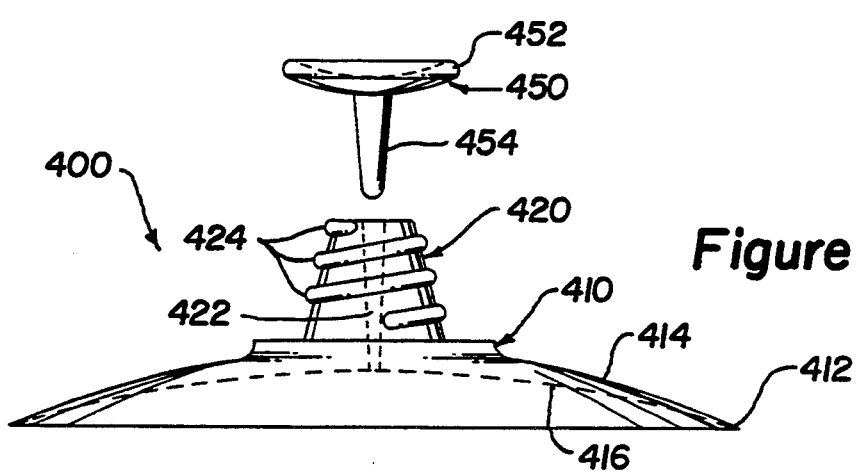
FIG. 9 is an exploded side elevational view of another embodiment of a suction cup assembly according to the present invention.
Figure 10:
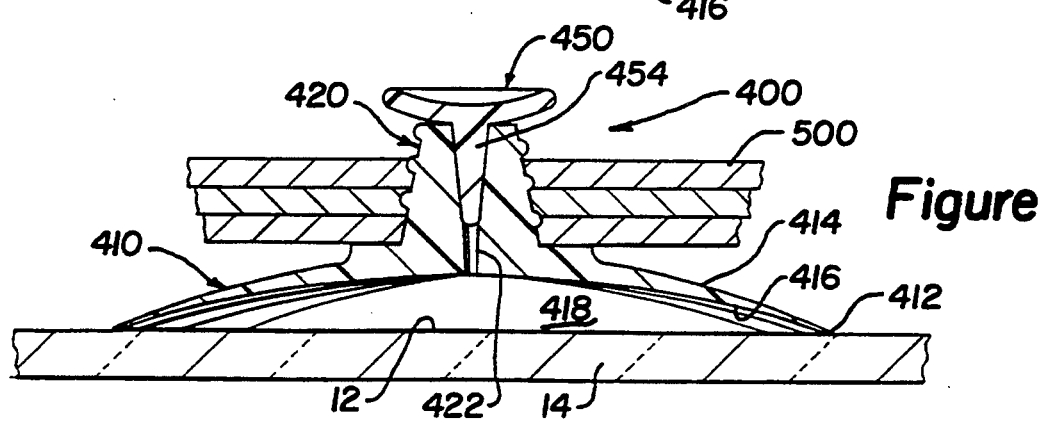
FIG. 10 is a sectional view showing the suction cup assembly of FIG. 9 mounted on an object having a threaded bore.

Another embodiment of the invention is illustrated in FIGS. 9 and 10 wherein the assembly is generally referred to by the reference numeral 400. The suction cup assembly 400 generally comprises a cup body 410 and a retainer 450. The cup body 410 is generally cup-shaped and has a peripheral edge 412, an outer surface 414 and an inner surface 416 which defines a concavity. Preferably, the peripheral edge 412 is circular. However, it could be of other generally cup-like shapes.

When the suction cup 410 is positioned adjacent a smooth surface such as surface 12 of glass pane 14, the inner surface 416 of suction cup body 410 and surface 12 substantially close the concavity to form a chamber 418. The body of suction cup 410 is preferably made of a resilient material such as rubber or plastic and has sufficiently resilient properties such that when pressed against a smooth surface, the cup body is deformed and flattened onto the surface 12 and the volume of chamber 418 is greatly reduced. As the volume of the chamber 418 is reduced, air is expelled from the chamber. The deformable body of the suction cup 410 conforms to the smooth surface 12 and forms and air-tight seal against the smooth surface. Atmospheric pressure acting on the outer surface 414 of the suction cup retains the suction cup against the smooth surface 12.

A stem portion 420 is integrally formed on the body of suction cup 410. Preferably, the stem portion is generally cylindrical in shape but slightly tapered as shown. The stem portion 420 has a duct 422 therethrough which communicates between the chamber 418 and the outer atmosphere. Preferably, the duct 422 is generally cylindrical in shape and coaxial with the circular cup body 410.

In the embodiment illustrated in FIGS. 9 and 10, the stem portion 420 has threads 424 formed on the outside thereof which are used to maintain an object (such as multi-layered wall 500) on the stem portion 420. The aperture in wall 500 may have corresponding threads formed on the interior thereof.

The removable retainer 450 is preferably integrally formed of a substantially non-resilient plastic material and has a top portion 452 and a central plug portion 454. The central plug 454 is slightly tapered from the top portion 452 and adapted to plug the duct 422 of the stem portion 420. The central plug 454 also assists in maintaining the rigidity of the stem portion 420, thereby assisting in maintaining the threads 424 in proper engagement with the correspondingly threaded aperture.

To mount wall 500 to a smooth surface 12, the stem portion 420 of the suction cup 410 is threaded into the corresponding threads of the aperture formed in the wall 500, thereby connecting the suction cup 410 to the wall 500. The wall 500 is positioned adjacent the surface 12 as desired. Until the retainer 450 is positioned within the duct 422 of stem portion 420 as shown in FIG. 10, the chamber 418 defined by the inner surface 416 of the suction cup 410 and the surface 12 does not form a vacuum seal.

Once pressed into position as shown in FIG. 10, the central plug 454 of the retainer 450 prevents air from communicating between the chamber 418 and the outer atmosphere. The suction cup assembly 400 can be pressed against the surface 12 to expel air from the chamber 418. The deformable suction cup 410 forms an air-tight seal against the smooth surface 12. Atmospheric pressure outside the body 410 retains the suction cup against the surface.

If the object was not mounted in the desired position or it is desirable to change its position, the removable retainer 450 of the suction cup assembly 400 can be loosened or pulled out to unplug the duct 422 and break the vacuum seal of the suction cup 410. The object and suction cup assembly 400 can then be easily repositioned adjacent the surface as desired.

Even though numerous characteristics and advantages of the present invention have been set forth in the foregoing description together with details of the structure and function of the invention, the disclosure is illustrative only. Various changes may be made in detail, especially in matters of shape, size, and arrangement of the parts, within the principles of the invention to the full extent indicated by the broad general meaning of the terms used. The restrictive description and drawings of the specific examples above do not point out what an infringement of this of this patent would be, but are to provide at least one explanation of how to make and use the invention. The limits of the invention and the bounds of the patent protection are measured by and defined in the appended claims.

What is claimed:

1. A suction cup assembly comprising:
    (a) a cup body having an inner surface and an outer surface defining a deformable arcuate flange with a concave inner surface, a port in said concave surface connected to a duct extending through said cup body, and surface means on said cup body forming a valve seat surrounding said port in said concave surface;
    (b) a valve for selectively closing said port having a valve surface and a stem portion with said valve surface selectively engaging said valve seat to close said port and said stem portion extending through said duct, said stem portion and said duct defining a passageway therebetween so that fluid can flow through said duct with said stem portion therein; and
    (c) a removable retainer on said stem portion.

2. A suction cup assembly as described in claim 1 wherein said stem portion of said valve is threaded and said removable retainer is a threaded connector.

3. A suction cup assembly as defined in claim 2 wherein said cup body has an outer annular surface surrounding said duct and said removable retainer has an opposed annular surface whereby said threaded stem portion can be positioned through an aperture in an object to be mounted adjacent a support surface with an annular area of said object adjacent the aperture clamped between said outer annular surface of said cup body and said annular surface of said removable retainer.

4. A suction cup assembly comprising:
(a) a concave cup body having an inner surface and an outer surface and a duct extending therethrough;
(b) an elongated valve extending through said duct and having an enlarged end portion on one end thereof with a cross-section larger than the cross-section of said duct supported within said concave body adjacent said inner surface; and
(c) a retainer removeably mounted on the other end of said valve for releasably attaching said cup body to another object.

5. A suction cup assembly as defined in claim 4 wherein said elongated valve is threaded on said other end and said releasable retainer is a threaded connector.

6. A suction cup assembly as defined in claim 4 wherein said cup body has an annular seat formed on said inner surface around the opening of said duct.

7. A suction cup assembly as defined in claim 6 wherein said retainer releasably applies axial force to said valve stem to releasably force said enlarged portion against said seat.

8. A suction cup assembly as defined in claim 6 wherein said enlarged end portion is formed to mate with said annular seat.

9. A support assembly comprising:
(a) an object having at least one mounting aperture therein;
(b) a cup body of deformable material having a mounting neck thereon sized and shaped to fit into said aperture and a duct extending axially through said neck, said neck having an annular slot therein defining concentric inner and outer cylindrical walls with said outer cylindrical wall formed of a plurality of outwardly deformable wall segments; and
(c) an elongated valve having a generally tapered plug portion adapted to deform said neck outwardly when said valve is inserted axially into said duct and an annular wedge portion adapted for insertion into said annular slot.

10. A support assembly comprising:
(a) an object having at least one mounting aperture therein;
(b) a cup body of deformable material having a mounting neck thereon sized and shaped to fit into said aperture and a duct extending axially through said neck; and
(c) an elongated valve having a generally tapered plug portion adapted to deform said neck outwardly when said valve is inserted axially into said duct;
(d) wherein said neck has threads formed thereon and said mounting aperture of said object is correspondingly threaded whereby said mounting neck can be threaded into said aperture to connect said cup body to said object.

11. A suction cup assembly for mounting an object having an aperture for connecting the object to the suction cup assembly comprising:
(a) a cup body defining a concavity formed of sufficiently resilient material whereby said suction cup body can be pressed against a smooth surface to create a seal between said suction cup body and the smooth surface and form a chamber;
(b) a stem on said cup body extending away from said concavity and having an expanded lip portion thereon spaced from said cup body and having a dimension larger than an aperture in an object to be mounted, whereby said stem has a relatively narrow neck portion between said expanded lip portion and said cup body with the neck portion sized to fit within the aperture of the object and said stem having a slot adjacent said expanded lip portion so that at least a portion of said expanded lip portion can be at least partially deformed into said slot, whereby the dimension of said expanded lip portion is sufficiently reduced to pass through said aperture; and
(c) a removable cap having a wedge portion inserted into said slot and expanding said lip portion of said stem so that the object is retained on said stem.

12. A suction cup assembly as defined in claim 11 wherein said cup body and said stem are integrally formed of the same resilient material.

13. A suction cup assembly as defined in claim 11 wherein said stem is generally cylindrical in shape and defines a central axis; said slot is generally annular in shape and coaxial with the central axis of said stem; and said wedge portion is generally annular in shape.

14. A suction cup assembly as defined in claim 13 wherein said annular slot is tapered from a relatively larger opening end of said slot to a relatively smaller closed end of said slot; and said annular wedge portion is generally tapered to substantially conform to the tapered annular slot, whereby the farther said wedge portion is inserted into said slot, the more the expanded lip portion is forced outwardly to enlarge the dimension of the lip portion to retain the object on said neck portion of said stem.

15. A suction cup assembly as defined in claim 11 further comprising at least one vent formed in said stem communicating between the concavity defined by said cup body and the surrounding atmosphere, said cap preventing the communication of air through said vent when said wedge portion is at least partially inserted in said slot, whereby said suction cup body can be positioned on the smooth surface as desired until said wedge portion is at least partially inserted in said slot and the cup assembly is pressed against the smooth surface to releasably mount the cup body to the surface.

16. A suction cup assembly as defined in claim 15 wherein said cap further comprises a plug portion adapted for plugging said vent in said stem when said cap is at least partially inserted in said slot.

* * * * *